United States Patent [19]

Seidel et al.

[11] 4,439,111
[45] Mar. 27, 1984

[54] SOLAR PUMPING INSTALLATION FOR PUMPING LIQUID AND SOLAR COLLECTOR CONSTRUCTION

[75] Inventors: Albert Seidel; Dietmar Wolf, both of Siegertsbrunn, Fed. Rep. of Germany

[73] Assignee: Messerschmitt-Bölkow-Blohm GmbH, Fed. Rep. of Germany

[21] Appl. No.: 944,904

[22] Filed: Sep. 22, 1978

[30] Foreign Application Priority Data

Oct. 6, 1977 [DE] Fed. Rep. of Germany ....... 2744952

[51] Int. Cl.³ .............................................. F04B 47/08
[52] U.S. Cl. .................................... 417/379; 60/527; 60/641.8; 60/673; 126/443
[58] Field of Search ............... 60/527, 528, 641, 649, 60/673; 417/379; 126/417, 448, 447, 446, 436, 126, 443, 442, 419, 432

[56] References Cited

U.S. PATENT DOCUMENTS

| | | | |
|---|---|---|---|
| 2,688,923 | 9/1954 | Bonaventura et al. | 60/641 X |
| 2,918,219 | 12/1959 | MacCracken | 417/379 X |
| 3,112,862 | 12/1963 | Sherock | 417/379 |
| 3,122,728 | 2/1964 | Lindberg, Jr. | 60/527 X |
| 3,937,599 | 2/1976 | Thureau et al. | 417/379 X |
| 4,036,208 | 7/1977 | Bauer | 126/446 |
| 4,085,590 | 4/1978 | Powell et al. | 60/649 X |
| 4,150,923 | 4/1979 | Wardman | 417/379 |

FOREIGN PATENT DOCUMENTS 1516262 6/1978 United Kingdom ................ 126/443

*Primary Examiner*—Leonard E. Smith
*Attorney, Agent, or Firm*—McGlew and Tuttle

[57] ABSTRACT

A solar pumping system, comprises, a pumping housing which defines a pump chamber therein which is adapted to be positioned in the ground below ground water level. Displacer means in the form of, for example, a bladder, arranged within the pump chamber, is capable of displacing liquid out of the pump chamber in response to a pressurized medium acting thereon to expel the water out of the chamber and up to a level above the ground for use. A suction valve connected into the chamber permits the ground water to flow into the chamber and a discharge valve connected out of the chamber permits the outflow of the ground water during the action of the displacer means. The construction includes a solar collector having at least one hydride conduit which is adapted to be exposed to the sun for solar heating to act on the hydride to cause hydrogen to be formed, the pressure of which acts against the displacer means to displace the ground liquid out of the pump chamber. When the solar collector is shielded and the hydride is permitted to cool or is cooled rapidly by the circulation of water thereover, the pressure of the generated hydrogen decreases, permitting ground water to enter into the pumping chamber once again through the suction valves.

11 Claims, 5 Drawing Figures

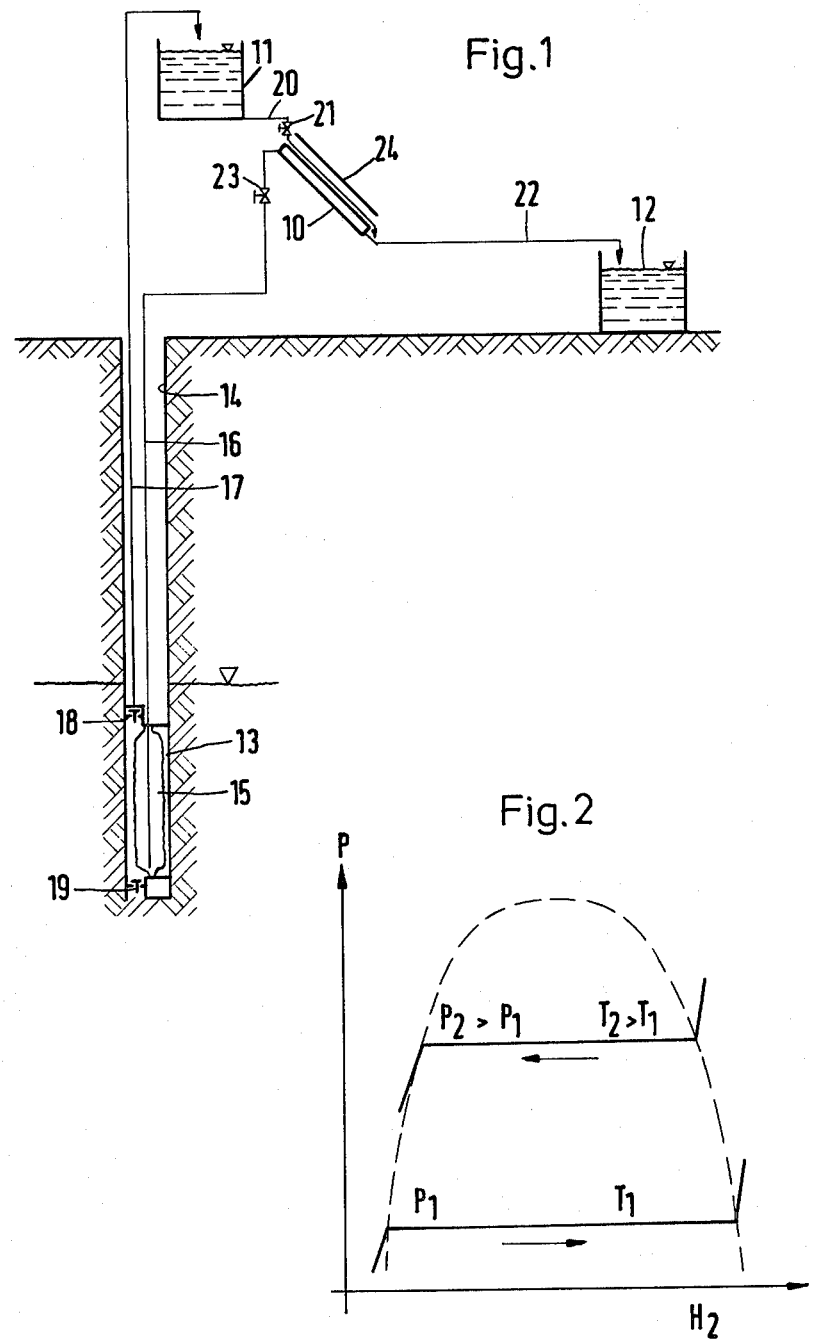

SOLAR PUMPING INSTALLATION FOR PUMPING LIQUID AND SOLAR COLLECTOR CONSTRUCTION

FIELD AND BACKGROUND OF THE INVENTION

This invention relates to solar pumping devices in general and, in particular, to a new and useful solar pumping system using a hydride conduit which is heated by solar radiation for generating hydrogen to provide pressure for the displacement of the liquid out of a pumping chamber arranged below the ground water level and which includes means for cooling the hydride by shielding the solar collector and passing the water thereover for reducing the pressure and permitting the inflow of the ground water into the pumping chamber.

DESCRIPTION OF THE PRIOR ART

Solar pumping installations may, for example, serve the purpose of conveying ground water to the surface for irrigation of soils, or also as drinking water in the dry regions of the earth. A solar pump which is designed for this purpose is known from U.S. Pat. No. 2,688,923, in which it is proposed to concentrate the solar radiation by a reflector onto two boilers, disposed in the focal point of the reflector, in order to evaporate water therein and to operate, with this vapor, pressure suction pumps arranged below the earth's surface.

In the installation of the above-noted patent, it is necessary to provide two separate subterranean pump chambers, each connected with one of two boilers which are disposed in the reflector. In order to avoid the danger of condensing out, which is high in the case of steam, the pump lines, as well as the pumps are well-insulated. In addition, riser lines are provided which ensure the displacement of the operating water intended for vaporization from one boiler into the next.

However, because of the danger of condensing-out of the operating water in the bore hole, and because of the high apparative superstructure, thus, for example, for the basic design of the pump, several valves, hose lines and the already mentioned reflector with pivoting mechanism are necessary and thus, this installation cannot fulfill the requirements of simplicity, freedom from maintenance and compactness which is required of such installations precisely in the very sunny regions of the earth and, hence, predominantly in the developing zones.

SUMMARY OF THE INVENTION

The present invention provides a solar pumping installation which essentially functions without mechanically moving parts and requires a minimum of maintenance, and wherein, the danger of condensing-out is non-existent, so that expensive insulation of the well hole and the pump are avoided, but which is also able to raise liquid in a satisfactory degree.

The collector comprises chambers filled with metal hydride, in which due to the solar radiation, hydrogen is separated. The hydrogen is conducted through a pressure line to a displacer, which is disposed below the level of the liquid to be pumped, and is installed in a pump chamber. The pump chamber is equipped with a suction valve and a pressure valve clearing a riser line. The collector is arranged between an upper liquid tank connected to the riser line and a lower liquid tank, and the liquid overflow thereof is controlled through the collector.

A particular advantage of the invention is that an efficient pumping system is made available which can be produced at a relatively low cost, which is operable with little or no maintenance because of the absence of moving parts, and which permits a plurality of combinations, i.e., larger or smaller installations can be set up as needed by the modular system, without adverse effects on the cost-profit ratio.

Accordingly, an object of the invention is to provide a solar pumping system which comprises a pump housing, defining a pump chamber therein, adapted to be positioned in the ground below the ground water level and which includes suction and discharge valve means for the inflow of ground water and the discharge of ground water out of the pumping chamber, for example, to a place above ground level for use, and further including a solar collector having at least one hydride conduit therein for exposure to the sun for solar heating connected to the pump chamber to pressurize the chamber upon heating of the hydride by acting upon displacer means, such as a bladder arranged in the pump housing, and displaceable therein to increase the pressure to expel the water therefrom, and with means for shielding the hydride conduit against the sun and for colling the hydride to lower the pressure in the hydride conduit to permit the inflow of the ground water level into the chamber through the suction valve means.

Another object of the invention is to provide a solar collector which includes a housing having insulation therein with at least one hydride conduit extending through said housing having a surface exposed for receiving radiation heat from the sun, said conduit including an outer tube with an inner tube for the passage of liquid therethrough and with a space between said outer tube having hydride therein exposed for heating by solar radiation.

A further object of the invention is to provide a solar pumping system and a solar collector which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a somewhat schematic, side elevational view and partly sectional view of a solar pumping system, constructed in accordance with the invention;

FIG. 2 is a curve indicating the principle of operation of a solar system with metal hydride;

DESCRIPTION OF THE PREFERRED EMBODIMENTS

Figure 4:
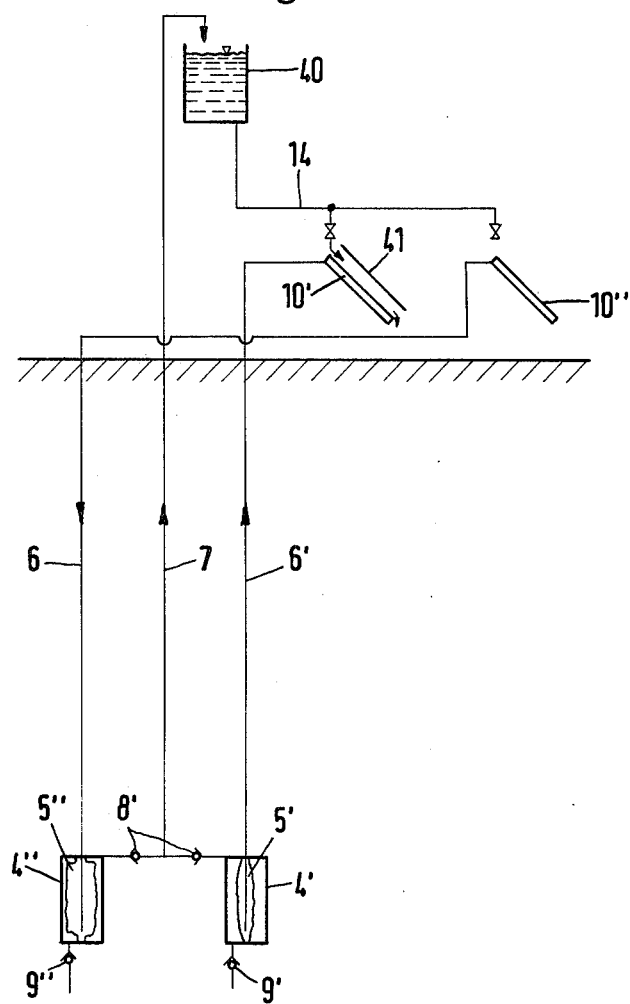
FIG. 4 is a view similar to FIG. 1 of another embodiment of the invention.

Referring to the drawings in particular, the invention embodied therein as shown in FIG. 1, comprises, a solar pumping system which includes a pump housing 13 defining a pump chamber 13a which is adapted to be positioned in a bore hole 14 at a location below ground level 60 and below the ground water level 70. Suction valve means 19 are associated with the pump chamber 13a for the admission of ground water into the pump chamber, and discharge valve means 18 are connected out of the chamber 13a for the discharge of the ground water therefrom up through a riser tube 17 which has an exit end 17a directed into an upper water tank 11. Displacer means 15 are associated with the pump chamber 13a and it operates under pressure produced by the heating of a hydride in a solar collector 10 to actuate said displacer means to displace the liquid through the discharge valve means 18. The solar collector is provided with a shield 24 and a suitable cooling means for cooling the hydride to reduce the pressure of hydrogen generated by the solar heating and to reduce the pressure in the pump chamber 13a so that the displacer means 15 permits the entrance of the ground water into chamber 13a for the next cycle.

According to FIG. 1, the solar pumping installation comprises a collector 10, which is filled with metal hydride (see FIG. 5 also), an upper and a lower water tank 11 and 12, respectively, and a pump chamber 13, which is disposed in a bore hole 14. An inflatable bladder 15, into which a pressure line 16 opens is arranged in the pump chamber 13. The pump chamber is, in turn, connected with the upper water tank 11 through a riser line 17.

As can be seen from FIG. 1, pump chamber 13 is arranged below the ground water level 60 and is equipped with a suction valve 19 and a pressure valve 18. The suction valve 19 at the bottom of the pump chamber 13, serves to let in the water to be pumped, while the pressure valve 18, clearing the riser line, closes the pump chamber during the suction phase.

A cooling water line 20 leads to the collector 10 from the upper water tank 11. The collector 10 can be cut off from this line through a valve 21. A gutter 22, over which the water flowing over the collector can run off to the lower water tank 12, is provided at the lower end of collector 10. Pressure line 16 and collector 10 can also be cut off by a valve 23. Lastly, a shield 24 is provided, which selectively shields the collector from sunlight or opens it to the sunlight.

The principle of operation of a solar system with a metal hydride is illustrated in FIG. 2.

At low temperature $T_1$, that is, in the cooled state of the collectors, and at low pressure $P_1$, the metal or alloy is able to absorb hydrogen until a state of saturation is reached. The heat to be removed is transported out of the upper water tank 11 by the ground water already pumped. If heat is supplied to the saturated metal hydride, the temperature rising, then the hydrogen pressure increases and is given off again almost completely at the higher temperature level $T_2 > T_1$ and constant heat supply by the solar radiation until no more hydrogen is desorbed.

The metal hydride to be used must be selected according to the temperature of the ground water, which temperature establishes the lowest possible hydrogen pressure in the collector during the cooling thereof, and in accordance with the necessary delivery height H of the water. Examples of such metals and alloys are: Ti, Mg, FeTi, FeTiMg, LaNi$_5$, misch metal Ni$_5$, SmCo$_5$, mixtures of these metals, etc.

A pumping cycle of the installation according to FIG. 1 proceeds as follows: When collector 10, which is filled with metal hydride (see also FIG. 5) has been cooled by the collector shield 24 or by overflowing water, a low H$_2$ pressure prevails therein. In this state, the space between the bladder 15 and the wall of the pump chamber 13 fills up across the suction valve 19 due to the pressure of the ground water. The pressure of the ground water comes about in the simplest case due to the fact that the pump chamber is arranged far enough below the ground water level 70. The pump chamber fills up with water until the bladder closely surrounds the H$_2$ line. The cooling of the collector 10 is now stopped, and the shield 24 is removed. Due to the heat supply of the solar radiation, the temperature of the metal hydride and, hence, the H$_2$ pressure, rises, and due to the continued heat supply, the H$_2$ escapes from the hydride and flow through line 16 into the interior of bladder 15. Bladder 15 expands until it completely hugs the inner wall of the pump chamber.

During this phase, the suction valve 19 closes automatically and the displaced water flows through the pressure valve 18 and the water riser line 17 into the upper water tank 11. Thereafter, the collector, with shield 24, is disconnected, and valve 21 of the cooling water line 20 is opened. The pumped water now flows over the collector 10, and the hydride in the collector cools off. This causes the H$_2$ pressure drop, and the hydrogen in the bladder is again absorbed by the almost empty hydride. Due to the falling of the H$_2$ pressure, the pressure valve 18 closes automatically, and after further falling of the H$_2$ pressure, the suction valve 19 opens again under the action of the ground water pressure. The entire process then starts anew.

Figure 3:
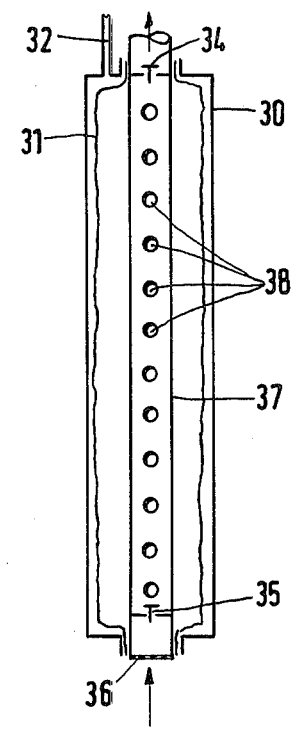
FIG. 3 is a transverse sectional view of a pump for use in the solar system of the invention.

FIG. 3 shows a pump housing, defining a pump chamber 30 in a design form with water displacement from the exterior inwardly. In this design form, the hydrogen penetrates through a line 32 into the pump chamber 30 and acts on the bladder 31. The bladder, in turn, embraces a tube 37, which is provided with outlet openings 38. In the suction state, the water to be pumped passes through a screen or sieve 36 and a suction valve 35 permits pumping into the chamber defined by the bladder 31. As the hydrogen pressure rises, the bladder 31 is compressed and the sucked-up water issues again via a discharge valve 34 and, as shown in FIG. 1, reaches the upper water tank 11.

The inflatable bladder may in all design forms be made of a suitable material, such as various types of rubber, polyethylene, Perbunan, etc. The only requirement is that the material be sufficiently flexible and hydrogen-tight. Of course, in place of a bladder, a piston or the like provided with seal rings may be used as well.

FIG. 4 illustrates how an alternating operation, i.e., a stabilization of the water pumping process with elements of the invention can be achieved, or respectively, a larger quantity of water can be pumped in the same unit of time. To this end, one operates with two or more systems of hydride-filled collectors 10', 10", etc., with one collector 10' being cooled and, hence, absorbing H$_2$, while the other collector is heated solarly and thus desorbs H$_2$ and pumps water. Accordingly, bladder 5' is almost collapsed, while bladder 5" is almost completely expanded. Lines 6, 6' represent the H₂ feed lines. On the undersides of the chambers 4, the previously described suction valves 9', 9" are provided for the entrance of the ground water.

In the example of construction, a riser line 7 is provided which is common for the pump chambers 4', 4" and operated by valves 8', 8". Naturally, a separate riser line may be provided as well for reach pump chamber. Equally obvious, is to accommodate two or more than two pump housings 4' and 4" in a common bore hole or in separate bore holes. In addition, a common upper water tank for all collectors to be cooled may be provided or, alternatively, groups of tanks for groups of collectors may be provided.

Figure 5:
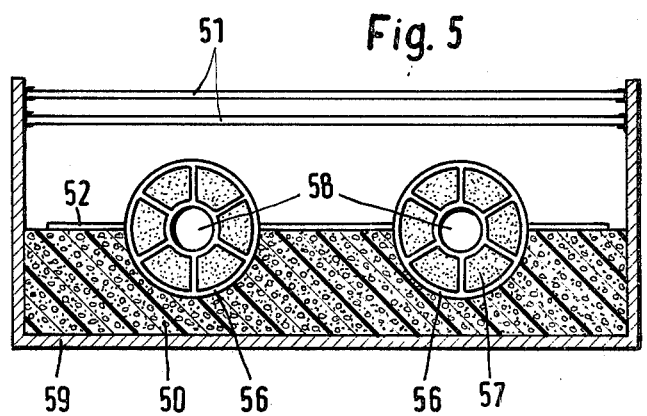
FIG. 5 is a transverse sectional view of a solar collector for use with the solar system of FIGS. 1 and 4.

FIG. 5 shows a form of construction of a flat collector, filled with a metal hydride. As the upper temperature of the hydride for the desorption of the H₂ does not exceed values of 70° C. to 80° C., the collector is designed as a flat collector with a glass covering 51 (single or double), known per se from other applications. The difference from other solar collectors consists in that, instead of pipes or the like for the uptake of the liquid heat carrier medium, chambers are provided for the uptake of the solid metal hydride. The section through a form of construction illustrated in FIG. 5 indicates that finned pipes 56 containing the hydride filling 57 are equipped with a cooling water duct 58. In this way, either the surface of the finned pipes, or the ducts, or both, can be selectively jointly utilized for cooling. The finned pipes are embedded in back in a foam insulation 50. If necessary, one or two covering glasses improve the efficiency of the collector in a known manner. It is also very useful to cover the front of the collector pipes with a black absorption layer. The entire construction is received in a housing or frame 59.

As is evident from the description, the installation can also be used for pumping other suitable liquids or respectively water from other sources, for example, a reservoir. To this end, it is sufficient to place the pump chamber low enough in the liquid volume from which it is desired to pump.

While specific embodiments of the invention have been shown and described in detail to illustrate the application of the principles of the invention, it will be understood that the invention may be embodied otherwise without departing from such principles.

What is claimed is:

1. A solar pumping system, comprising, a pump housing defining a pump chamber therein, adapted to be positioned in the ground below ground water level, suction valve means connected into said pump chamber for the admission of ground water into said pump chamber, discharge valve means connected out of said chamber for the discharge of ground water therefrom, displacer means in said housing displaceable therein by increase of pressure to expel water through said discharge valve means, a solar collector having at least one hydride conduit therein exposed to the sun for solar heating thereof having hydride therein connected to said pump chamber for generating hydrogen to pressurize said chamber upon heating of said hydride to increase the pressure in said hydride conduit and said pump chamber to force said displacer means to expel water from said pump chamber, and means for cooling said hydride conduit to lower the pressure in said hydride conduit and to permit the inflow of ground water into said chamber through said suction valve means, wherein said means for cooling said hydride conduit comprises a shield for shielding said solar collector.

2. A solar pumping system, as claimed in claim 1, wherein said displacer means comprises an inflatable bladder.

3. A solar pumping system, as claimed in claim 1, wherein said displacer means comprises a bladder, said suction valve means and said discharge valve means being disposed within said bladder.

4. A solar pumping system, as claimed in claim 1, wherein said pump housing comprises a plurality of pump housing portions, each having displacer means and each having a hydride conduit connected thereto, said solar collector comprising at least two separate solar collectors, each having a hydride conduit connected to a respective pumping chamber, said means for cooling the hydride conduit comprising said shield for the collector and means for placing said shield over said collector.

5. A solar pumping system, as claimed in claim 4, wherein there are a plurality of solar collectors, at least one having means for applying said shield thereto, while the other is open to solar radiation.

6. A solar pumping system, comprising, a pump housing defining a pump chamber therein, adapted to be positioned in the ground below ground water level, suction valve means connected into said pump chamber for the admission of ground water into said pump chamber, discharge valve means connected out of said chamber for the discharge of ground water therefrom, displacer means in said housing displaceable therein by increase of pressure to expel water through said discharge valve means, a solar collector having at least one hydride conduit therein exposed to the sun for solar heating thereof having hydride therein connected to said pump chamber for generating hydrogen to pressurize said chamber upon heating of said hydride to increase the pressure in said hydride conduit and said pump chamber to force said displacer means to expel water from said pump chamber, and means for cooling said hydride conduit to lower the pressure in said hydride conduit and to permit the inflow of ground water into said chamber through said suction valve means, wherein said means for cooling a hydride conduit comprises an upper water tank above said collector connected to said discharge valve means for receiving water therefrom, a connection from said upper water tank through said collector for the passage of the water thereover for cooling said collector.

7. A solar pumping system, as claimed in claim 6, wherein said displacer means comprises a bladder arranged in said pump chamber, said suction valve means and said discharge valve means being arranged outside of said bladder.

8. A solar pumping system, as claimed in claim 6, wherein said hydride conduit has a hydride therein consisting of one of the following alloys: FeTi; FeTiMg; FeTiMn; TiV; LaNi₅; misch metal Ni₅ or SnCo₅.

9. A solar pumping system, comprising, a pump housing defining a pump chamber therein, adapted to be positioned in the ground below ground water level, suction valve means connected into said pump chamber for the admision of ground water into said pump chamber, discharge valve means connected out of said chamber for the discharge of ground water therefrom, displacer means in said housing displaceable therein by increase of pressure to expel water through said discharge valve means, a solar collector having at least one hydride conduit therein exposed to the sun for solar heating thereof having hydride therein connected to said pump chamber for generating hydrogen to pressurize said chamber upon heating of said hydride to increase the pressure in said hydride conduit and said pump chamber to force said displacer means to expel water from said pump chamber, and means for cooling said hydride conduit to lower the pressure in said hydride conduit and to permit the inflow of ground water into said chamber through said suction valve means, said hydride conduit including an inner wall portion for the passage of a cooling medium therethrough and an outer wall portion surrounding said inner wall portion defining a space between said inner and outer wall portions containing said hydride.

10. A solar pumping system as claimed in claim 9, wherein said solar collector includes a housing having insulation therein, said conduit extending through said housing disposed on said insulation, said inner wall portion and said outer wall portion being tubular.

11. A solar pumping system, as claimed in claim 9, including a plurality of ribs extending radially between said outer and inner wall portions.

* * * * *